United States Patent [19]
Tsutsui

[11] Patent Number: 5,832,424
[45] Date of Patent: Nov. 3, 1998

[54] SPEECH OR AUDIO ENCODING OF VARIABLE FREQUENCY TONAL COMPONENTS AND NON-TONAL COMPONENTS

[75] Inventor: Kyoya Tsutsui, Kanagawa, Japan

[73] Assignee: Sony Corporation, Tokyo, Japan

[21] Appl. No.: 848,700

[22] Filed: May 27, 1997

Related U.S. Application Data

[63] Continuation of Ser. No. 306,659, Sep. 15, 1994, abandoned.

[30] Foreign Application Priority Data

Sep. 28, 1993 [JP] Japan .................................. 5-241189

[51] Int. Cl.$^6$ ........................................................ G10L 3/02
[52] U.S. Cl. .......................... 704/206; 704/204; 704/224; 704/230; 704/226; 704/205
[58] Field of Search .................................... 704/203–206, 704/214, 219, 224, 226–229, 500–504

[56] References Cited

U.S. PATENT DOCUMENTS

| | | | |
|---|---|---|---|
| 3,973,081 | 8/1976 | Hutchins | 179/1 SA |
| 4,184,049 | 1/1980 | Crochiere et al. | 179/1 SA |

(List continued on next page.)

FOREIGN PATENT DOCUMENTS

| | | | |
|---|---|---|---|
| 0145788 A1 | 6/1985 | European Pat. Off. | H04B 12/02 |
| 0255111 A2 | 2/1988 | European Pat. Off. | G11B 20/10 |
| 0289080 A1 | 11/1988 | European Pat. Off. | H04B 1/66 |
| 0409248 A2 | 1/1991 | European Pat. Off. | H03M 7/30 |
| 0 424 016 A3 | 4/1991 | European Pat. Off. | H04B 1/66 |
| 0420745 A2 | 4/1991 | European Pat. Off. | H04B 1/66 |
| 0421259 A2 | 4/1991 | European Pat. Off. | H04B 1/66 |
| 0428156 A2 | 5/1991 | European Pat. Off. | H03M 7/30 |
| 0446031 A2 | 9/1991 | European Pat. Off. | H04B 1/66 |
| 0 473 367 A1 | 3/1992 | European Pat. Off. | H03M 7/30 |
| 0 506 394 A2 | 9/1992 | European Pat. Off. | G10L 7/00 |
| 0 525 809 A2 | 2/1993 | European Pat. Off. | H04B 1/66 |
| 61-201526 | 9/1986 | Japan | H04B 14/00 |
| 63-110830 | 5/1988 | Japan | H04B 14/06 |
| 3-109824 | 5/1991 | Japan | H03M 7/30 |
| 3-117919 | 5/1991 | Japan | H03M 7/30 |
| 3-139922 | 6/1991 | Japan | H03M 7/30 |
| 3-256411 | 11/1991 | Japan | H03M 7/30 |
| 3-263925 | 11/1991 | Japan | H03M 7/30 |
| 6-29934 | 2/1994 | Japan | H04B 14/06 |
| 6-149292 | 5/1994 | Japan | G10L 9/08 |
| WO 92/17884 | 10/1992 | WIPO | G11B 20/10 |

OTHER PUBLICATIONS

P. Meuse, "A 2400 BPS Multi–Band Excitation Vocoder," IEEE ICASSP, Apr. 3–6, 1990, pp. 9–12.

D. Griffin et al., "Multiband Excitation Vocoder," IEEE Transactions on Acoustics, Speech & Signal Processing, vol. 36, No. 8, Aug. 1988, pp. 1223–1235.

D. Griffin et al., "A High Quality 9.6 KBPS Speech Coding System," Proc. IEEE ICASSP, Apr. 13–20, 1986, pp. 125–128.

M. Torres–Guijarro et al., "Improved Analysis/Synthesis Methods for the Multiband Excitation Coder," IEEE Mediterranean Electrotechnical Conference, Apr. 12–14, 1994, pp. 57–60.

M. Brandstein et al., "A Real–Time Implementation of the Improved MBE Speech Coder," IEEE ICASSP, Apr. 3–6, 1990, pp. 5–8.

(List continued on next page.)

*Primary Examiner*—David D. Knepper
*Attorney, Agent, or Firm*—Limbach & Limbach L.L.P.

[57] ABSTRACT

Frequency components are broken into a first signal made up of a plurality of tonal components and a second signal made up of other components. The number of the frequency components making up the tonal components is variable. Tonal signals may be encoded efficiently depending on the manner of distribution of their spectral energy to assure more efficient encoding on the whole. If the signals compression coded in this manner are recorded on a recording medium, the recording capacity may be employed effectively. Also, high-quality acoustic signals may be obtained on decoding signals reproduced from the recording medium.

36 Claims, 13 Drawing Sheets

U.S. PATENT DOCUMENTS

| | | | |
|---|---|---|---|
| 4,455,649 | 6/1984 | Esteban et al. | 370/80 |
| 4,535,472 | 8/1985 | Tomcik | 381/31 |
| 4,748,579 | 5/1988 | Zibman et al. | 364/726 |
| 4,827,336 | 5/1989 | Acampora et al. | 358/135 |
| 4,896,362 | 1/1990 | Veldhuis et al. | 381/30 |
| 4,912,763 | 3/1990 | Galand et al. | 381/31 |
| 4,932,062 | 6/1990 | Hamilton | 381/43 |
| 4,972,484 | 11/1990 | Theile et al. | 381/37 |
| 5,049,992 | 9/1991 | Citta et al. | 358/140 |
| 5,081,681 | 1/1992 | Hardwick et al. | 381/51 |
| 5,109,417 | 4/1992 | Fielder et al. | 381/36 |
| 5,115,240 | 5/1992 | Fujiwara et al. | 341/51 |
| 5,117,228 | 5/1992 | Fuchigami et al. | 341/200 |
| 5,134,475 | 7/1992 | Johnston et al. | 358/133 |
| 5,142,656 | 8/1992 | Fielder et al. | 381/37 |
| 5,151,941 | 9/1992 | Nishiguchi et al. | 381/46 |
| 5,157,760 | 10/1992 | Akagiri | 395/2 |
| 5,166,686 | 11/1992 | Sugiyama | 341/155 |
| 5,185,800 | 2/1993 | Mahieux | 381/29 |
| 5,222,189 | 6/1993 | Fielder | 395/2 |
| 5,226,084 | 7/1993 | Hardwick et al. | 381/41 |
| 5,243,588 | 9/1993 | Maeda et al. | 369/54 |
| 5,244,705 | 9/1993 | Tsurushima et al. | 428/64 |
| 5,264,846 | 11/1993 | Oikawa | 341/76 |
| 5,268,685 | 12/1993 | Fujiwara | 341/76 |
| 5,285,476 | 2/1994 | Akagiri et al. | 375/25 |
| 5,294,925 | 3/1994 | Akagiri | 395/2.13 |
| 5,301,205 | 4/1994 | Tsutsui et al. | 375/1 |
| 5,311,561 | 5/1994 | Akagiri | 375/122 |
| 5,347,611 | 9/1994 | Chang | 395/2.35 |
| 5,367,608 | 11/1994 | Veldhuis et al. | 395/2.38 |
| 5,375,189 | 12/1994 | Tsutsui | 395/2.38 |
| 5,381,143 | 1/1995 | Shimogoshi et al. | 381/37 |
| 5,388,209 | 2/1995 | Akagiri | 395/2.38 |
| 5,416,604 | 5/1995 | Park | 358/433 |
| 5,438,643 | 8/1995 | Akagiri et al. | 395/2.1 |
| 5,461,378 | 10/1995 | Shimoyoshi et al. | 341/51 |
| 5,471,558 | 11/1995 | Tsutsui | 395/2.28 |
| 5,717,821 | 2/1998 | Tsutsui et al. | 704/205 |
| 5,765,126 | 6/1998 | Tsutsui et al. | 704/206 |

OTHER PUBLICATIONS

H. Hassanein et al., "A Hybrid Multiband Excitation Coder for Low BIT Rates," IEEE Internation Conference on Selected Topics in Wireless Communications, Jun. 25–26, 1992, Vancouver, BC, pp. 184–187.

K. Brandenbug et al., "ASPEC: Adaptive Spectral Perceptual Entropy Coding of High Quality Music Signals," 90Th Convention of the AES, Feb. 19–22, 1991, pp. 1–11.

G. Davidson et al., "Low–Complexity Transform Coder for Satellite Link Applications," 89Th Convention of the AES, Sep. 21–25, 1990, pp. 1–22.

D. Esteban et al., "Application of Quadrature Mirror Filters to Split Band Voice Coding Schemes," IEEE ICASSP, May 9–11, 1977, pp. 191–195.

J. Johnston, "Transform Audio Coding of Audio Signals Using Perceptual Noise Criteria," IEEE Journal on Selected Areas in Communications, vol. 6, No. 2, Feb. 1988, pp. 314–323.

Y. Mahieux et al., "Transform Coding of Audio Signals at 64 KBIT/S," IEEE Global Telecommunications Conf. & Exhibit, Dec. 2–5, 1990, pp. 518–522.

E. Schroder et al., "High Quality Digital Audio Encoding With 3.0 BITS/Sample Using Adaptive Transform Coding," 80Th Convention of the AES, Mar. 4–7, 1986, pp. 1–7.

G. Stoll et al., "Masking–Pattern Adapted Subband Coding: Use of the Dynamic BIT–Rate Margin," 84Th Convention of the AES, Mar. 1–4, 1988, pp. 1–33.

G. Theile et al., "Low BIT–Rate Coding of High Quality Audio Signals—An Introduction to the MASCAM System," EBU Review/Technical, No. 230, Aug. 1998, Brussels, Belgium, pp. 158–181.

Adaptive Transform Coding With An Adaptive Block Size (ATC–ABS)—Sugiyama et al. Apr. 3–6, 1990 pp. 1093–1096.

Digital Coding of Speech in Sub–bands, Crochiere, et al., AT&T Co., The Bel System Technical Journal, vol. 55, No. 8., Oct. 1976, pp. 1069–1085.

Subband/Transform Coding Using Filter Bank Designs Based On Time Domain Aliasing Cancellation, Princen et al. 1987 IEEE, pp. 50.1.1–50.1.4.

Polyphase Quadrature Filters—A New Subband Coding Technique, Rothweiler ICASSP Apr. 14–16, 1983 Boston pp. 1280–1283.

Adaptive Transform Coding of Speech Signals, Zelinski et al. IEEE Transactions On Acoustics, Speech, and Signal Processing, vol. ASSP–25, No. 4, Aug. 1977 pp. 299–309.

The Critical Band Coder—Digital Encoding of Speech Signals Based on the Perceptual Requirements of the Auditory System, Michael A. Krasner, 1980 IEEE vol. 1–3 pp. 327–331.

SPEECH OR AUDIO ENCODING OF VARIABLE FREQUENCY TONAL COMPONENTS AND NON-TONAL COMPONENTS

This is a continuation of application Ser. No. 08/306,659 filed on Sep. 15, 1994, now abandoned.

BACKGROUND OF THE INVENTION

This invention relates to a signal encoding and decoding apparatus in which input digital data is encoded, transmitted, recorded, reproduced and decoded by high efficiency encoding and decoding to produce playback signals, and to a recording medium for recording the encoded signals.

There are a wide variety of techniques for high efficiency encoding of audio or speech signals. In sub-band coding (SBC), which is of the non-frame-forming system, the frequency band of the audio signal on the time axis is divided into plural sub-bands for encoding without forming the signal into frames along the time axis prior to coding. In transform encoding, which is of the frame-forming system, each frame of digital signals representing the audio signals on the time axis is converted by an orthogonal transform into a block of spectral coefficients representing the audio signal on the frequency axis. In a combination of sub-band coding and transform coding, the digital signal representing the audio signal are divided into a plurality of frequency ranges by sub-band coding, and transform coding is applied to each of the frequency ranges.

Known filters for dividing a frequency spectrum into a plurality of frequency ranges include the quadrature mirror filter (QMF), as discussed in, for example, R. E. Crochiere, Digital Coding of Speech in Sub-bands, 55 BELL SYST. TECH. J., No.8, (1976). The technique of dividing a frequency spectrum into equal-width frequency ranges is discussed in Joseph H. Rothweiler, Poly-Phase Quadrature Filters—A New Sub-band Coding Technique, ICASSP 83 BOSTON.

Known techniques for orthogonal transform include the technique of dividing the digital input audio signal into frames of a predetermined time duration, and processing the resulting frames using a fast Fourier transform (FFT), discrete cosine transform (DCT) or modified DCT (MDCT) to convert the signals from the time axis to the frequency axis. Discussion of a MDCT may be found in J. P. Princen and A. B. Bradley, Sub-band/Transform Coding Using Filter Bank Based on Time Domain Aliasing Cancellation, ICASSP 1987.

By quantizing the signals divided by a filter into subbands or the signals converted by orthogonal transform into blocks of spectral coefficients, it becomes possible to control the frequency band susceptible to quantization noise and to effect encoding with acoustically higher efficiency by taking advantage of masking effects. Encoding with still higher efficiency may be achieved by normalizing each band with, for example, the maximum absolute value of signal components in each band prior to quantization.

In a technique of quantizing the spectral coefficients resulting from an orthogonal transform, it is known to use sub-bands that take advantage of the psychoacoustic characteristics of the human auditory system. In this, spectral coefficients representing an audio signal on the frequency axis may be divided into a plurality of critical frequency bands. The width of the critical bands increase with increasing frequency. Normally, about 25 critical bands are used to cover the audio frequency spectrum of 0 Hz to 20 kHz. In such a quantizing system, bits are adaptively allocated among the various critical bands. For example, when applying adaptive bit allocation to the spectral coefficient data resulting from MDCT, the spectral coefficient data generated by MDCT within each of the critical bands is quantized using an adaptively allocated number of bits.

Known adaptive bit allocation techniques include that described in IEEE TRANS. ON ACOUSTICS, SPEECH, AND SIGNAL PROCESSING, VOL.ASSP-25, No.4 (1977, August) in which bit allocation is carried out on the basis of the amplitude of the signal in each critical band. This technique produces a flat quantization noise spectrum and minimizes noise energy, but the noise level perceived by the listener is not optimum because the technique does not effectively exploit the psychoacoustic masking effect. In the bit allocation technique described in M. A. Krassner, The Critical Band Encoder-Digital Encoding of the Perceptual Requirements of the Auditory System, ICASSP 1980, the psychoacoustic masking mechanism is used to determine a fixed bit allocation that produces the necessary signal-to-noise ratio for each critical band. However, if the signal-to-noise ratio of such a system is measured using a strongly tonal signal, such as a sin wave, non-optimum results are produced because of the fixed allocation of bits among the critical bands.

For solving these problems, there is proposed in the European Patent Publication No.0525809 A2, date of Publication of Application of 03. 02. 93, Bulletin 93/05, a high efficiency encoding apparatus in which the total number of bits available for bit allocation is allocated to a fixed bit allocation pattern pre-set for each small-sized block and variable bits dependent on signal energy in each block. The ratio of bit apportionment is set in dependence upon a signal related to the input signal. The smoother the signal spectrum, the larger is the bit apportionment to the fixed bit allocation patterns.

With this known method, a larger number of bits are allocated to a block having a particular spectral element having a high energy level, as in the case of a sine wave input, for significantly improving the overall signal to noise characteristics. Since the human auditory sense is extremely sensitive to a signal having an acute spectral component, the method is effective in improving the sound quality psychoacoustically in order to improve the signal to noise ratio.

A number of methods other than those described above have been proposed in connection with bit allocation. If a model simulating the auditory sense is refined further and the encoding device is improved in ability, encoding efficiency may be improved further.

Referring to FIGS. 11 to 16, a conventional signal encoding apparatus is explained.

In these figures, an acoustic signal waveform supplied via a terminal 100 is transformed by a transform circuit 101 into signal frequency components, which are encoded by a signal component encoding circuit 102. A code string is generated by a code string generating circuit 103 and outputted at a terminal 104.

FIG. 12 schematically shows a structure of the transform circuit 101 shown in FIG. 11. In FIG. 12, the signal supplied to a terminal 200 (the signal outputted to the terminal 100 of FIG. 11) is divided by dual frequency-dividing filters 201, 202 into three frequency bands. Thus the filter 201 thins outs the signal from the terminal 201 by ½, while the filter 202 thins out the signal thinned out by ½ by the filter 201 further by ½ (the signal from the terminal 200 is thinned out by ¼). That is, the filter 202 outputs two signals each having a bandwidth equal to ¼ of the bandwidth of the signal from the terminal 200.

The signals divided by the filters 201, 202 into the three bands are transformed into spectral signal components by forward orthogonal transform circuits, such as MDCT circuits 203, 204 and 205. Outputs of these forward orthogonal transform circuits 203 to 205 are routed to the signal component encoding circuit 102 shown in FIG. 11.

FIG. 13 schematically shows the construction of the signal component encoding circuit 102 shown in FIG. 11.

In FIG. 13, the output of the transform circuit 101, supplied to a terminal 300, is normalized for each pre-set range by a normalizing circuit 301 and thence routed to a quantization circuit 303. The signal supplied at the terminal 300 is also routed to a quantization precision decision circuit 302.

The quantization circuit 303 quantizes the signal from the normalization circuit 301 on the basis of precision of quantization as calculated from the signal supplied at the terminal 300 by the quantization precision decision circuit 302. An output of the quantization circuit 303 is outputted at a terminal 304 and thence routed to the code string generating circuit 103 shown in FIG. 11. Not only the signal components quantized by the quantization circuit 303, but also the information concerning the normalization coefficients in the normalization circuit 301 and the information concerning the precision of quantization in the quantization precision decision circuit 302 are contained in the output signal at the terminal 304.

FIG. 14 schematically shows the construction of a decoding device for decoding acoustic signals from the code string generated by the encoding device of FIG. 11 and outputting the decoded acoustic signals.

Referring to FIG. 14, a code string break-down circuit 401 extracts codes of the various signal components from the code string generated by the arrangement of FIG. 11 and supplied via a terminal 400. From these codes, the signal components are decoded by a signal component decoding circuit 402 and subsequently processed by an inverse transform circuit 403 with inverse transform which is an inverse operation of the transform performed by the transform circuit 101 shown in FIG. 11. This produces acoustic waveform signals which are outputted at a terminal 404.

FIG. 15 schematically shows a construction of the inverse transform circuit 403 shown in FIG. 14.

The construction of FIG. 15 corresponds to that of the transform circuit shown in FIG. 12. Signals supplied from the signal component decoding circuit 402 via terminals 501, 502 and 503 are transformed by inverse orthogonal transform circuits 504, 505, 506 performing inverse transform to forward transform shown in FIG. 12. Signals of the frequency ranges produced by the inverse transform circuits 504, 505, 506 are combined by dual stage band combining filters 507, 508.

That is, outputs of the inverse transform circuits 505, 506 are combined by the band combining filter 507, and an output of the band combining filter 507 and an output of the inverse transform circuits 504 are combined by the band combining filter 508. An output of the band combining filter 508 is outputted via a terminal 509 (terminal 404 of FIG. 14).

FIG. 16 illustrates the conventional encoding method carried out by the encoding device shown in FIG. 11. In the example of FIG. 16, the spectral signals shown therein are produced by the transform circuit shown in FIG. 12. FIG. 16 shows the level of the absolute values of the spectral signals obtained on MDCT and converted to dB values.

In FIG. 16, the input signal is converted into 64 spectral signals for each of pre-set time frames or blocks. These spectral signals are grouped in five pre-set bands b1 to b5 in FIG. 16. Each of these bands is herein termed an encoding unit. The bandwidths of the encoding units are selected to be narrower in the lower range and broader in the higher range in order to control generation of the quantization noise in conformity to characteristics of the human auditory sense.

However, with the above-described conventional method, the ranges for quantizing the frequency components are fixed. Consequently, if spectral components are concentrated in the vicinity of several specified frequencies, and if these spectral components are to be quantized with sufficient precision, it becomes necessary to allocate more bits to a large number of spectral components belonging to the same band as that of the spectral components.

That is, if normalization is performed for each of the preset bands, normalization is performed on the basis of the larger normalization coefficient determined by tonal components in the band b3 containing tonal components.

In general, the noise contained in a tonal acoustic signal in which the spectral energy is concentrated in a particular frequency is more harsh to the ear than the noise added to an acoustic signal, the energy of which is distributed smoothly over a broad frequency range, and hence presents significant obstruction to the human auditory sense. In addition, if the spectral component having a larger energy, that is the tonal component, is not quantized with sufficient precision, block-to-block distortion becomes larger when the spectral components are restored to waveform signals on the time axis and combined with temporally previous and succeeding blocks. That is, considerable connection distortion is produced when the restored block signals are combined with the temporally neighboring block signals, again presenting serious obstruction to the human auditory sense. For this reason, the tonal components need to be quantized using a sufficiently large number of bits for encoding. However, if the quantization precision is set for each of pre-set frequency bands, as described above, a large number of bits need to be allocated to a large number of spectral components in the encoding unit containing the tonal components, thus lowering the encoding efficiency. Thus it has been difficult to improve the encoding efficiency for tonal acoustic signals without lowering the sound quality.

For overcoming such inconvenience, the present Assignee has proposed in JP Patent Application No.5-152865 (1993) and JP Patent Application No.5-183322, which are not laid open as on the filing data of the present application, an encoding method in which, for realizing high encoding efficiency, the input acoustic signal is separated into a tonal component exhibiting energy concentration at a particular frequency and a component exhibiting smooth energy distribution over a broad frequency range and encoding is performed on each of the components.

With the proposed method, the tonal components are quantized with high precision over an extremely narrow range on the frequency axis and recorded along with the position on the frequency axis on a recording medium for realizing encoding with a higher efficiency than with the above-described method of quantizing the frequency components for the pre-set bands. Thus, in one aspect of the proposed method, a pre-set number of spectral components centered about the spectral component of the locally maximum energy of each tonal component are normalized and quantized for encoding. The contents of the above Patent Applications are recited herein because they are owned by the common Assignee to the present Application.

However, the spectral components making up acoustic signals are complex and a tonal component has discrete manner of spreading of the constituent spectral elements. That is, in the case of a sine wave, for example, the spectral component is rapidly decreased in energy with increasing departure from its frequency, and substantially all of the energy is concentrated in an extremely small number of spectral components.

Although tonal components can be extracted from the sound produced by an ordinary musical instrument, the energy distribution of the spectral elements making up each tonal component is not so acute as with the sine wave because of frequency fluctuations during musical performance. On the other hand, the manner of spreading of the spectral elements making up such tonal component varies significantly from one musical instrument to another.

If, for normalization and quantization of a pre-set number of spectral elements centered about the maximum energy spectral element of each tonal component, the number of the spectral elements is increased, spectral elements of extremely small magnitudes, which are removed from the central spectral element and which may be disregarded in view of the psychoacoustic effects as compared to the tonal components having extremely acute spectral energy distribution are also quantized. Thus a pre-set number of bits are required to deteriorate the coding efficiency.

Conversely, if the number of spectral elements is decreased, those spectral components which cannot be disregarded in view of the psychoacoustic effects with respect to the tonal component having less acute spectral energy distribution need to be encoded separately from the tonal component, thus lowering the encoding efficiency on the whole.

OBJECT AND SUMMARY OF THE INVENTION

In view of the above-depicted status of the art, it is an object of the present invention to provide a signal encoding/decoding apparatus capable of improving the encoding efficiency without deteriorating the sound quality for, above all, tonal acoustic signals, and a recording medium for recording signals processed by the signal encoding apparatus.

According to the present invention, there is provided a method for encoding an input signal having the steps of: breaking down the input signal into frequency components; separating the frequency components into a first signal made up of a plurality of tonal components and a second signal made up of other components, the number of the frequency components making up the tonal components being variable; encoding the first signal; and encoding the second signal.

According to the present invention, there is also provided an apparatus for encoding an input signal having: a unit for breaking down the input signal into frequency components; a unit for separating the frequency components into a first signal made up of a plurality of tonal components and a second input signal made up of other components, the number of the frequency components making up the tonal components being variable; a unit for encoding the first signal; and a unit for encoding the second signal.

According to the present invention, there is also provided a signal recording medium on which an encoded signal is recorded, the recording medium being formed by the steps of: breaking down an input signal into frequency components; separating the frequency components into a first signal made up of a plurality of tonal components and a second signal made up of other components, the number of the frequency components making up the tonal components being variable; encoding the first signal; encoding the second signal; and recording the encoded first and second signals on the recording medium.

According to the present invention, there is also provided a signal recording medium on which encoded signals are recorded, wherein information on plural tonal components and information on noisy components are recorded separately therein, and wherein the information on the tonal components includes information indicating the number of frequency components making up each tonal component.

According to the present invention, there is also provided a method for decoding an encoded signal having the steps of: decoding a first signal made up of plural tonal components to generate a first decoded signal; decoding a second signal made up of noisy components to generate a second decoded signal; and combining the first and second decoded signals and inverse transforming the combined signals, or separately inverse transforming the first and second decoded signals and combining the inverse transformed signals, the combining and inverse transforming step being performed on the basis of information indicating the number of the frequency components making up each tonal component.

According to the present invention, there is also provided an apparatus for decoding an encoded signal comprising: a first decoding unit for decoding a first signal made up of plural tonal components to generate a first decoded signal; a second decoding unit for decoding a second signal made up of noisy components to generate a second decoded signal; and a combining and inverse transforming unit for combining the first and second decoded signals and inverse transforming the combined signals, or separately inverse transforming the first and second decoded signals and combining the inverse transformed signals, the combining and inverse transforming unit performing the combining operation on the basis of information indicating the number of the frequency components making up each tonal component.

With the signal encoding unit of the present invention, tonal signals may be encoded efficiently depending on the manner of distribution of the spectral energy thereof for achieving the encoding with higher efficiency on the whole. That is, the tonal acoustic signals, above all, can be encoded without deteriorating the sound quality with improved coding efficiency. Consequently, should the compression coded signals be recorded on the recording medium, the recording capacity may be employed effectively. In addition, acoustic signals of high sound quality may be obtained on decoding the signals produced on reproducing the recording medium.

PREFERRED EMBODIMENTS OF THE INVENTION

Figure 1:
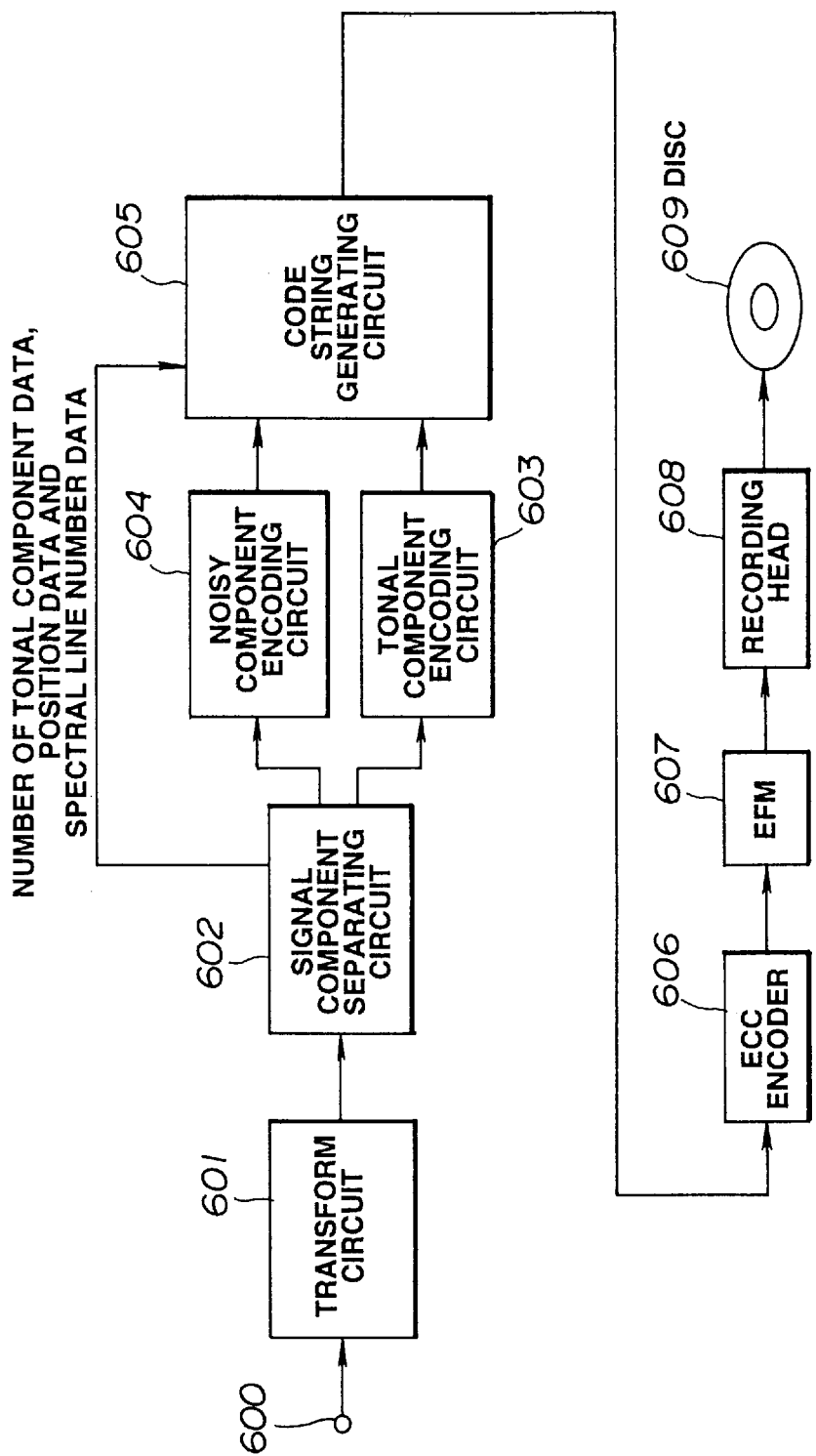
FIG. 1 is a block circuit diagram showing an arrangement of an encoding device according to an embodiment of the present invention.

Referring to the drawings, preferred embodiments of the present invention will be explained in detail.

FIG. 1 shows a schematic arrangement of a signal encoding device according to an embodiment of the present invention. In FIG. 1, an acoustic waveform signal is supplied to a terminal 600. The acoustic waveform signal is converted by a transform circuit 601 into signal frequency components which are routed to a signal component separating circuit 602.

The signal component separating circuit 602 separates the signal frequency components from the transform circuit 601 into tonal components each having an acute spectral distribution and noisy components each having other signal frequency components, that is presenting a flat spectral distribution. The tonal components, having the acute spectral distribution, are encoded by a tonal component encoding circuit 603, while the noisy components, which are the signal frequency components other than those having the acute spectral components, are encoded by a noisy component encoding circuit 604. Outputs of the tonal component encoding circuit 603 and the noisy component encoding circuit 604 are processed by a code string generating circuit 605 to generate an output code string. An ECC encoder 606 appends error correction code to the output code string of the code string generating circuit 605. An output of the ECC encoder 606 is modulated by an EFM circuit 607 so as to be supplied to a recording head 608. The recording head 608 records thee output code string of the EFM circuit 607 on a disc 609. The signal component separating circuit 602 outputs the information on the number of tonal components, position information data and the information on the number of spectral elements as later explained to the code string generating circuit 605.

Figure 12:
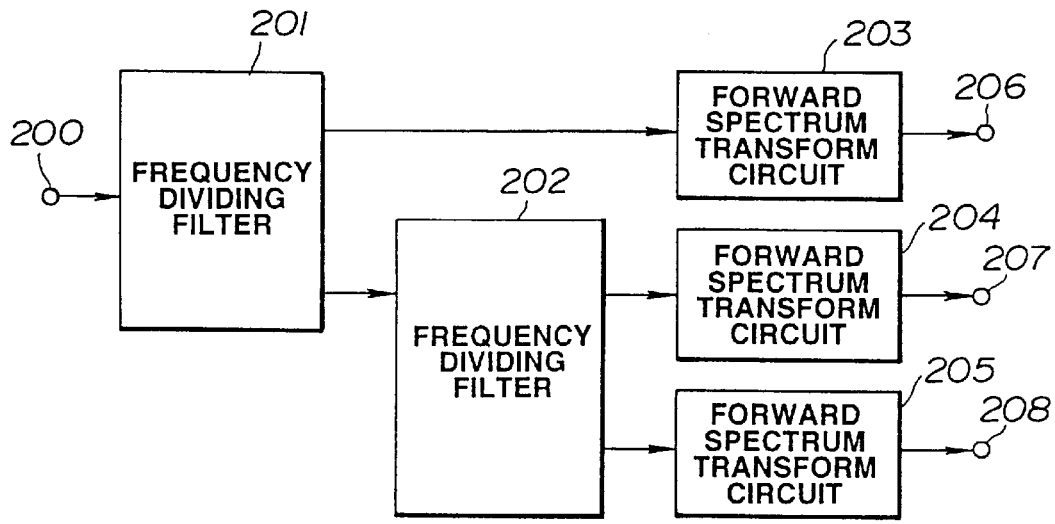
FIG. 12 is a block circuit diagram showing a construction of a transform circuit of the embodiment of FIG. 1 and the conventional encoding device.

For the transform circuit 601, an arrangement similar to one shown in FIG. 12 may be employed. Of course, the transform circuit 601 may be arranged in any different manner from the arrangement shown in FIG. 12. For example, the input signal may be directly transformed by MDCT into spectral signals, while the transform into spectral signals may be performed by DFT or DCT instead of by MDCT.

Although the signal may be separated into band components by a frequency dividing filter, the encoding method by the present encoding device may be carried out most effectively in cases wherein the signal energy is concentrated at a particular frequency. It is therefore advisable to employ the method of converting the input signal into spectral components by the above-mentioned orthogonal transform in which a large number of frequency components may be obtained with a fewer number of arithmetic-logical operations.

Figure 13:
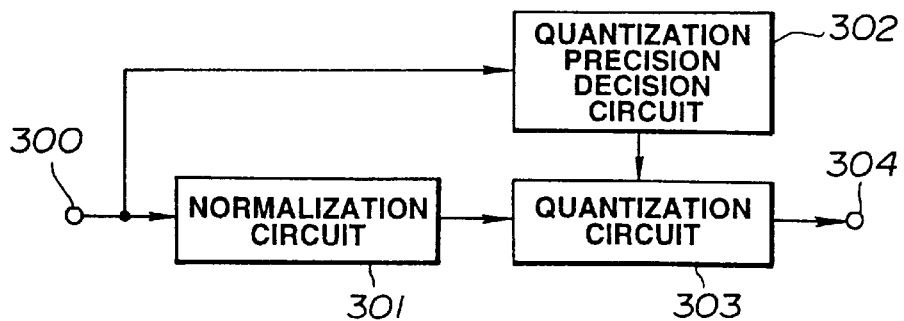
FIG. 13 is a block circuit diagram showing a construction of a signal component encoding circuit of the embodiment of FIG. 1 and the conventional encoding circuit.
Figure 14:
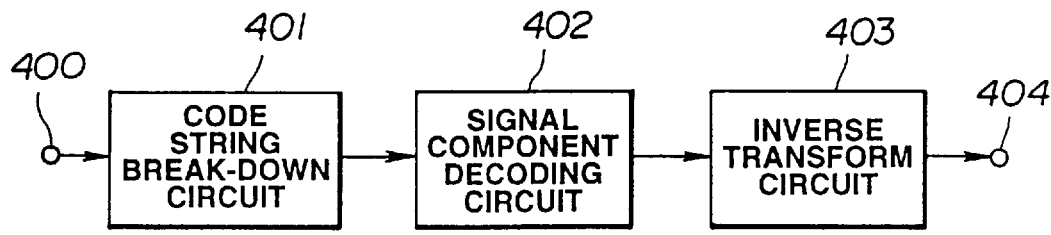
FIG. 14 is a block circuit diagram showing a construction of a conventional decoding device.

In addition, the tonal component encoding circuit 603 and the noisy component encoding circuit 604 may be implemented by an arrangement similar to the arrangement shown in FIG. 13.

Figure 2:
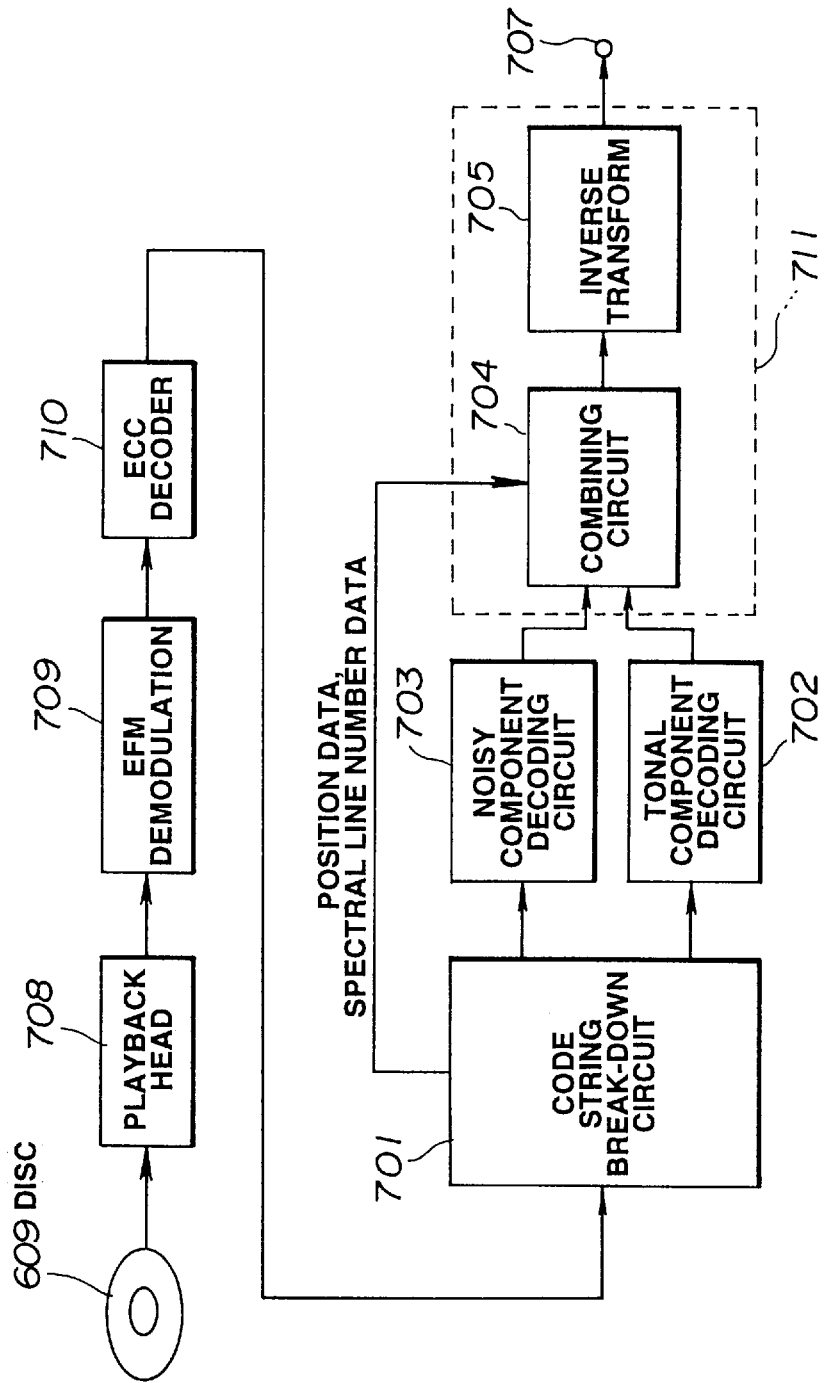
FIG. 2 is a block circuit diagram showing an arrangement of a decoding device according to an embodiment of the present invention.

FIG. 2 schematically shows an arrangement of a signal decoding device for decoding the signals encoded by the encoding unit shown in FIG. 1.

Figure 17:
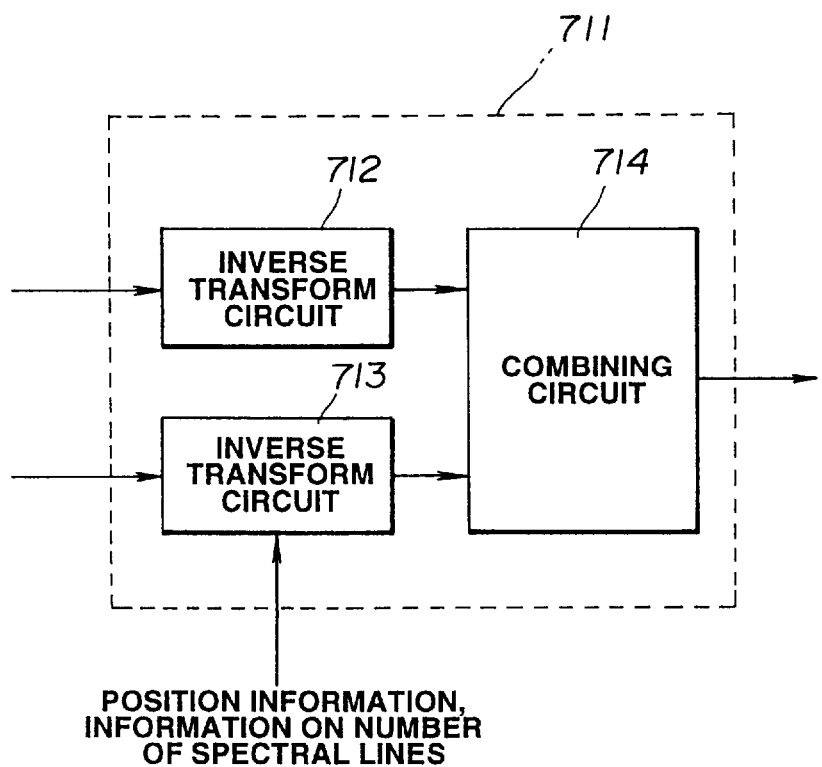
FIG. 17 is a block circuit diagram showing a construction of an alternative embodiment of the combining-inverse transform unit 711 of FIG. 2.

Referring to FIG. 2, the code string generated from the disc 609 by a reproducing head 708 is supplied to an EFM demodulating circuit 709 which demodulates the input code string. The demodulated code string is routed to an ECC decoder 710 where error correction is performed. A code string break-down circuit 701 recognizes which portion of the code string corresponds to the tonal component and separates the input code string into the code of the tonal component and the code of the noisy component. The code string separating circuit 701 separates the position information for the tonal component and the information for the number of the spectral elements from the input code string and outputs the separated information to a downstream side combining circuit 704. The code of the tonal component and the code of the noisy component are routed to a tonal component decoding circuit 702 and a noisy component decoding circuit 703, respectively, for dequantization and denormalization for decoding. The decoded signals from the tonal component decoding circuit 702 and the noisy component decoding circuit 703 are routed to a combining circuit 704 performing a combining operation which is the reverse of the separating operation performed by the signal component separating circuit 602 of FIG. 1. Based on the position information for the tonal components and the information on the number of the spectral components supplied from the code string separating circuit 701, the combining circuit 704 adds the decoded signals of the tonal components to a pre-set position of the decoded signals of the noisy components for combining the noisy components and the tonal components on the frequency axis. The synthesized decoded signals are transformed by an inverse transform circuit 705 performing an inverse transform which is the reverse of the transform performed by the transform circuit 601 shown in FIG. 1, and are thereby restored from the signals on the frequency axis into the original acoustic waveform signals on the time axis. Output waveform signals of the inverse transform circuit 705 are outputted at a terminal 705. The sequence in which inverse transform and combination are performed may be reversed, in which case a combining-inverse transform unit 711 shown in FIG. 2 is constructed as shown in FIG. 17. An inverse transform circuit 712 inverse transforms the decoded noisy component signals on the frequency axis from the noisy component decoding circuit 703 into the noisy component signals on the time axis. An inverse transform circuit 713 arrays decoded signals of the tonal components from the tonal component decoding circuit 702 at the positions on the frequency axis as indicated by the information on the number of spectral elements and the information on the tonal components supplied from the tonal component separating circuit 701 and inverse transforms the decoded signals of the tonal components to produce tonal component signals on the time axis. A combining circuit 714 combines the noisy component signals on the time axis from the inverse transform circuit 712 and the tonal component signals on the time axis from the inverse transform circuit 713 to regenerate the original acoustic waveform component signals.

Figure 15:
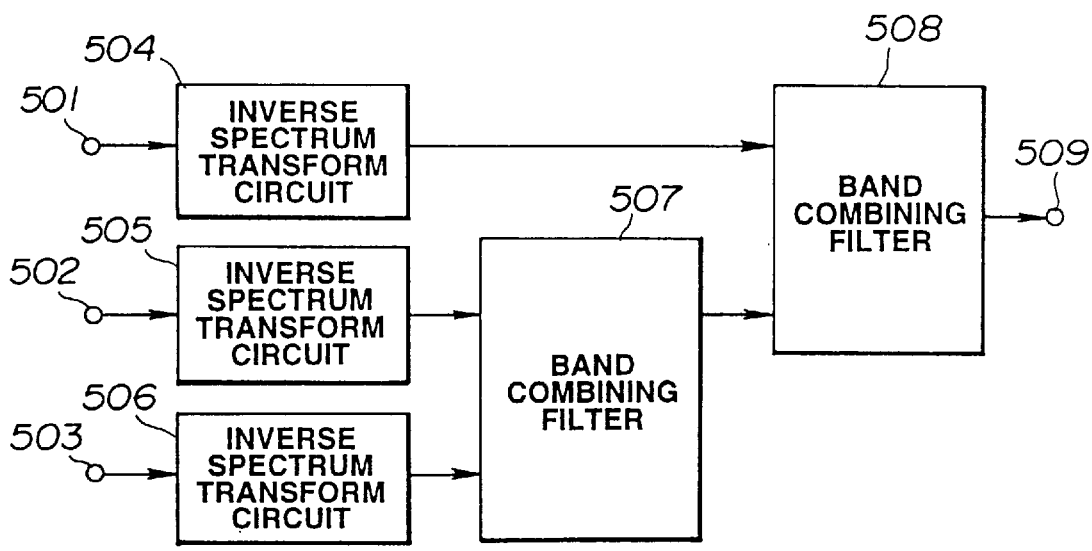
FIG. 15 is a block circuit diagram showing a construction of an inverse transform circuit of the embodiment of FIG. 1 and the conventional decoding device.
Figure 16:
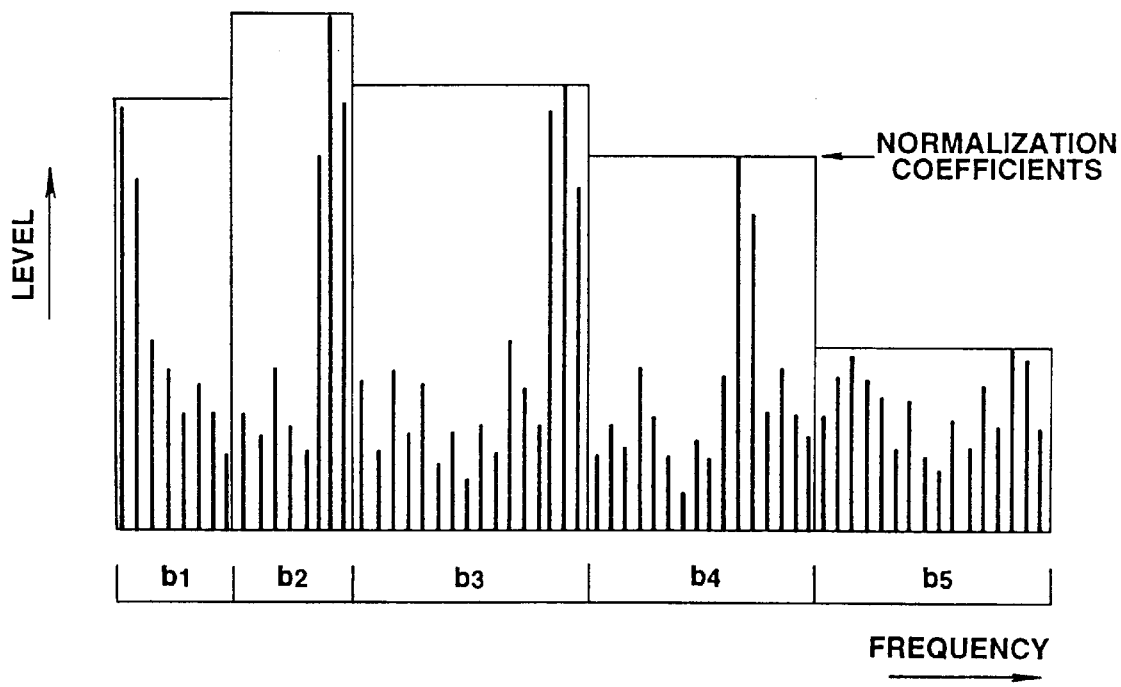
FIG. 16 illustrates the encoding method with the prior-art technique.

For the inverse transform circuits 705, 712 and 713, an arrangement shown in and described in connection with FIG. 15 may be employed.

Figure 3:
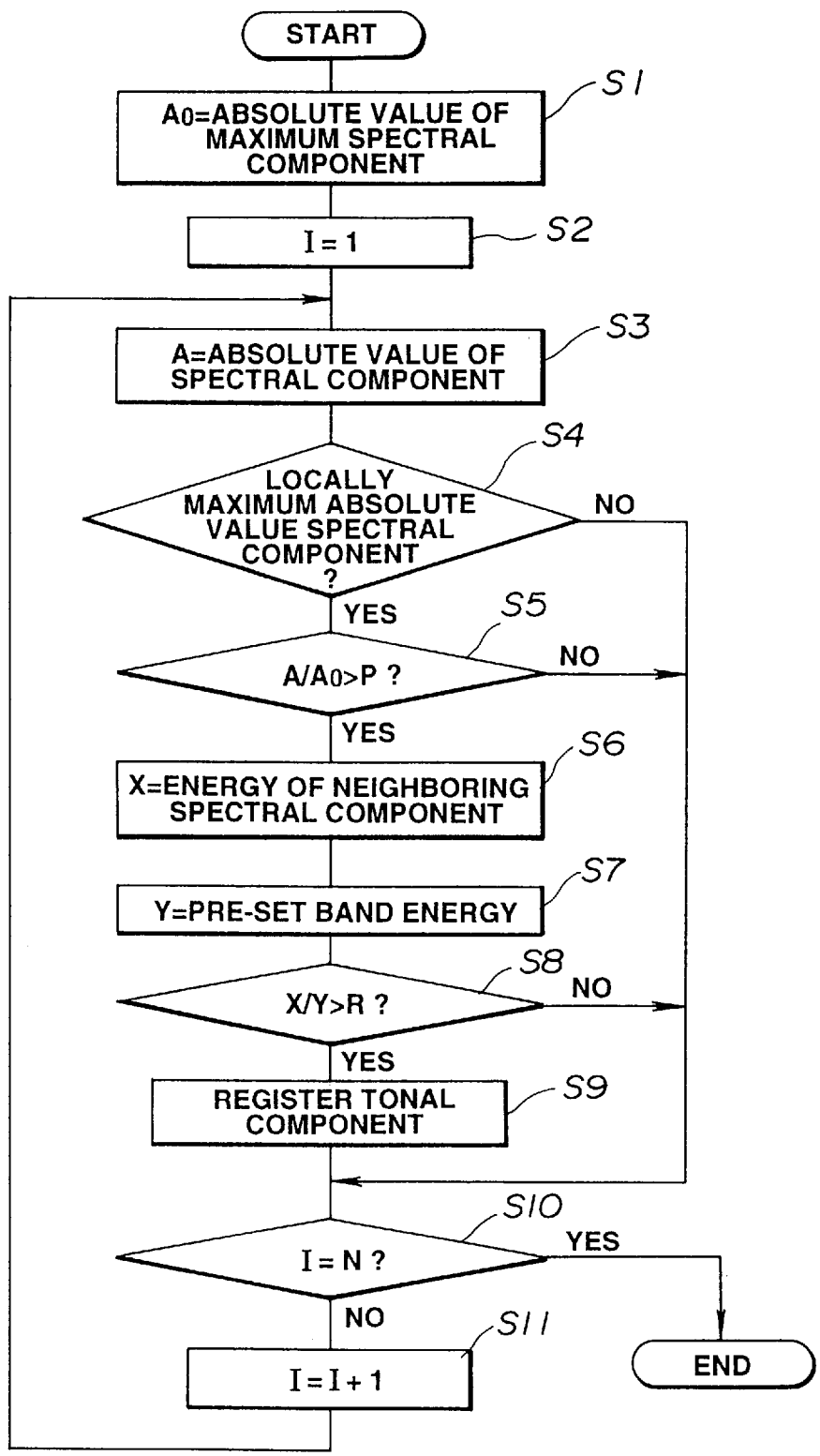
FIG. 3 is a flow chart showing the operational sequence in a signal component separating circuit according to an embodiment of the present invention.

FIG. 3 shows the operational sequence for separating tonal components in the signal component separating circuit 602 of the encoding unit shown in FIG. 1.

In FIG. 3, I and N denote the serial number of the spectral signals and the total number of the spectral signals, respectively. P and R, on the other hand, denote pre-set coefficients. As for the tonal components, if the absolute value of a given spectral signal ia locally larger than other spectral signals, and is larger by more than a pre-set value than the maximum absolute value of the spectral signals in the time frame or block (frame or block based upon which orthogonal transform is carried out) and the sum of the energy of the spectral signal and the energy of neighboring spectral elements, for example, the spectral elements on both sides of the spectral signal, is more than a pre-set ratio to the energy in a pre-set band including the spectral signal, the spectral signal and the spectral signals on either sides of the spectral signal are regarded as being tonal components. The pre-set band may be selected to be narrower and broader towards the lower and higher frequencies, respectively, in meeting with, for example, critical bandwidths, in order to take the characteristics of the auditory sense into account.

Referring to FIG. 3, the absolute value of the maximum spectral element is substituted for a variable $A_0$ at a step S1, and the serial number of the spectral signals is set to 1 at a step S2. At the next step S3, an absolute value of a certain spectral element is substituted for a variable A.

At a step S4, it is checked whether or not the absolute value of the spectral element is the absolute value of the locally maximum spectral signal, that is the absolute value of the spectral signal locally larger than other near-by spectral components. If the result is NO, that is if the absolute value of the spectral element is not the absolute value of the locally maximum spectral signal, processing transfers to a step S10. If the result is YES, that is if the absolute value of the spectral element is the absolute value of the locally maximum spectral signal, processing transfers to a step S5.

At the step S5, it is checked which of the ratio of the variable A of the absolute value of the locally maximum spectral element to the absolute value $A_0$ of the absolute value of the maximum spectral element in the time block including the absolute value of the locally maximum spectral element and the coefficient P representing a pre-set magnitude is larger ($A/A_0>P$ ?). If the result is YES, that is if $A/A_0$ is larger than P, processing transfers to a step S6. If the result is NO, that is if $A/A_0$ is not larger than P, processing transfers to a step S10.

At the step S6, the energy of spectral elements neighboring to the absolute value of the spectral element (absolute value of the locally maximum spectral element), for example, the sum of energy values of the spectral elements on either sides of the absolute value of the locally maximum spectral element, is substituted for a variable X. At the next step S7, the energy in the pre-set band including the absolute value of the locally maximum spectral element and the neighboring spectral elements is substituted for a variable Y.

At the next step S8, it is checked which of the ratio of the variable X of the above energy value to the variable Y for the energy of the pre-set band and the coefficient R representing a pre-set ratio is larger ($X/Y>R$ ?). If the result is YES, that is if X/Y is larger than R, processing transfers to a step S9. If the result is NO, that is if X/Y is not larger than R, processing transfers to the step S10.

At the step S9, the signal of the absolute value of the locally maximum spectral element and a number of spectral signals neighboring thereto are regarded as being tonal components, and that effect is registered.

At the next step S10, it is checked whether or not the number I of the spectral signal registered at the step S9 is equal to the total number N of the spectral signals (I=N ?). If the result is YES, processing comes to a close. If the result is NO, processing transfers to a step S11. At the step S11, the serial number of the spectral signals is incremented by one (I=I+1) after which processing reverts to the step S3. The above-mentioned sequence of operations is repeated.

Figure 4:
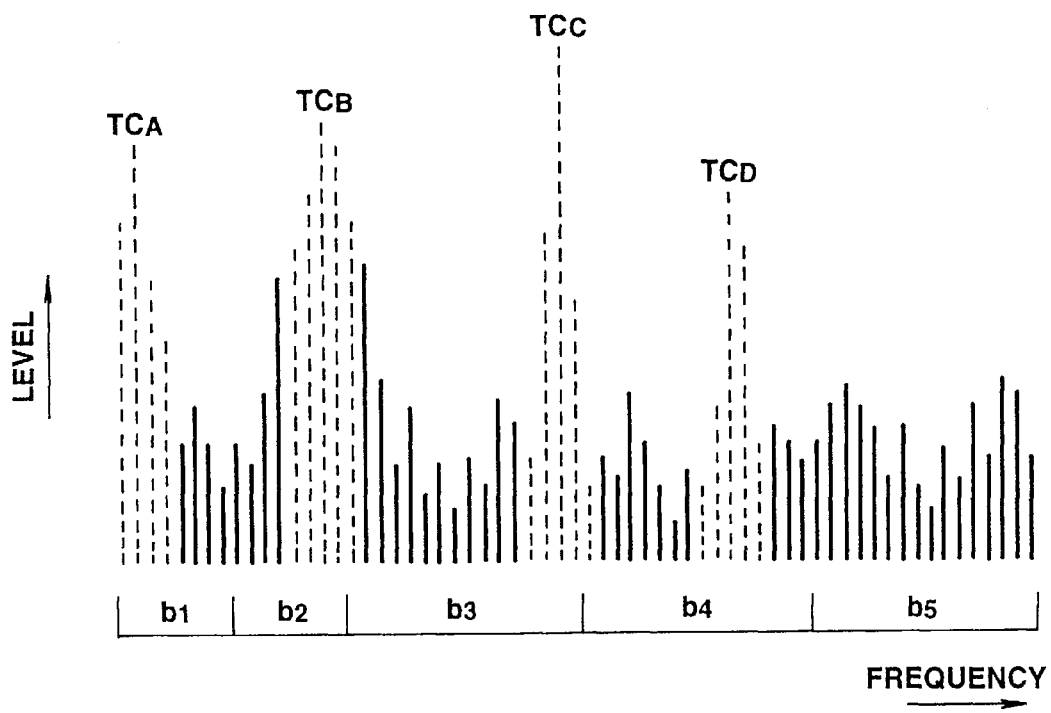
FIG. 4 illustrates a tonal component in the signal encoding with the embodiment of FIG. 1.

FIG. 4 shows an example of a case in which the number of spectral signals making up a tonal component is fixed.

In the example shown in FIG. 4, four tonal components $TC_A$, $TC_B$, $TC_C$, $TC_D$ are specifically shown. These tonal components are concentrated in a few spectral signals, as shown in the example of FIG. 4, so that, if these components are quantized with high precision, the number of bits is not increased on the whole. Although the coding efficiency may be improved by normalizing and subsequently quantizing the tonal components, the processing for normalization and re-quantization may be omitted for simplifying the construction, because it is a smaller number of the spectral signals that make up the tonal component.

Figure 5:
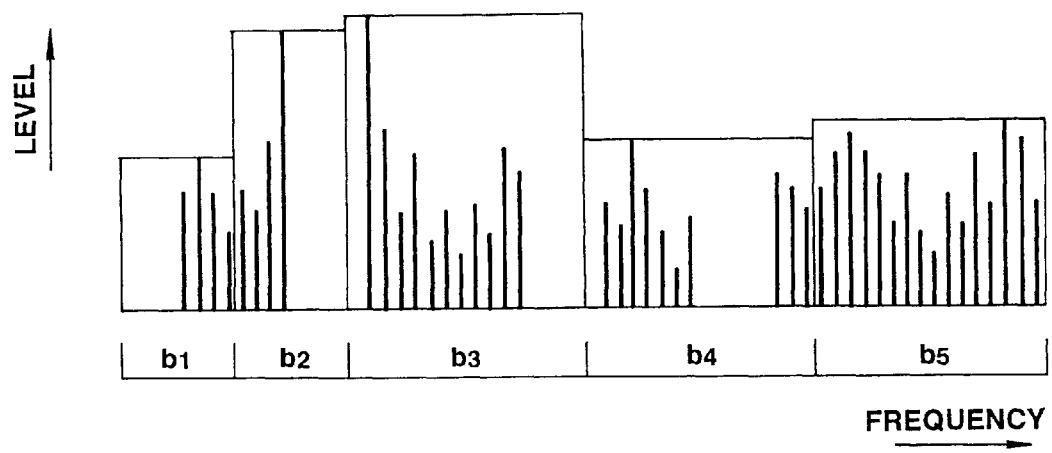
FIG. 5 illustrates a noisy component in the signal encoding with the embodiment of FIG. 1.

FIG. 5 shows the noisy components, that is the original spectral signals less the tonal components.

Referring to FIG. 5, since the tonal components are eliminated from the original spectral signals in the bands b1 to b5, the coefficients of normalization in the encoding units assume smaller values, so that the quantization noise may be diminished even with the smaller number of bits.

By separating the tonal components from the noisy components in this manner, encoding with a higher encoding efficiency may be realized than with the method of performing both normalization and quantization for each of the fixed bands. However, the number of spectral signals constituting each tonal component is fixed at 5, that is the signal of the absolute value of the locally maximum spectral signal and each two signals on the higher and lower sides of the signal, so that larger spectral signals are left in the noisy components freed of the tonal components $TC_B$ shown in FIG. 4, as shown for the bands b2 and b3 of FIG. 5. Consequently, these noise components are normalized with a larger coefficient of normalization and quantized for the bands b2 and b3 in FIG. 5, so that the encoding efficiency is lowered. The larger spectral signals may be extracted from these noisy components as the remaining tonal components for lowering the value of the coefficient of normalization for the noisy components. However, in such case, it becomes necessary to encode new tonal components.

On the other hand, as for the tonal components $TC_C$, $TC_D$ shown in FIG. 4, the spectral elements removed from the locally maximum spectral element are also encoded as being tonal. However, since a larger number of bits are required for quantizing tonal components with high precision, the coding efficiency would be lowered if the spectral elements having such small energy are encoded as being tonal.

Thus, with the unit of the present embodiment, the number of the spectral signals making up the tonal components is rendered variable. That is, five spectral components, inclusive of a dummy spectral component having a size equal to zero, and seven spectral components, centered about the signal of the absolute value of the locally maximum spectral signals, make up the tonal components $TC_A$ and $TC_B$, respectively. Similarly, three spectral components, similarly centered about the signal of the absolute value of the locally maximum spectral signal, make up the tonal components $TC_C$, $TC_D$.

Figure 7:
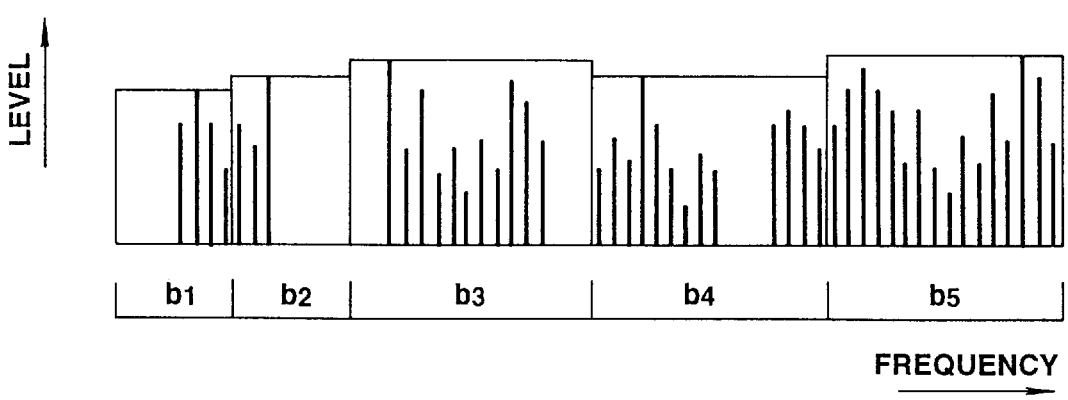
FIG. 7 illustrates the noisy components when the number of spectral elements making up the tonal component in the signal encoding with the embodiment of FIG. 1 is made variable.

FIG. 7 shows the distribution of the noisy components freed of these tonal components. It is seen from comparison with FIG. 5 that the smaller value may be used as the coefficients of normalization for the bands b2 and b3 for improving the coding efficiency. The number of the spectral signals of the tonal components $TC_C$, $TC_D$ is decreased for further improving the coding efficiency.

Figure 8:
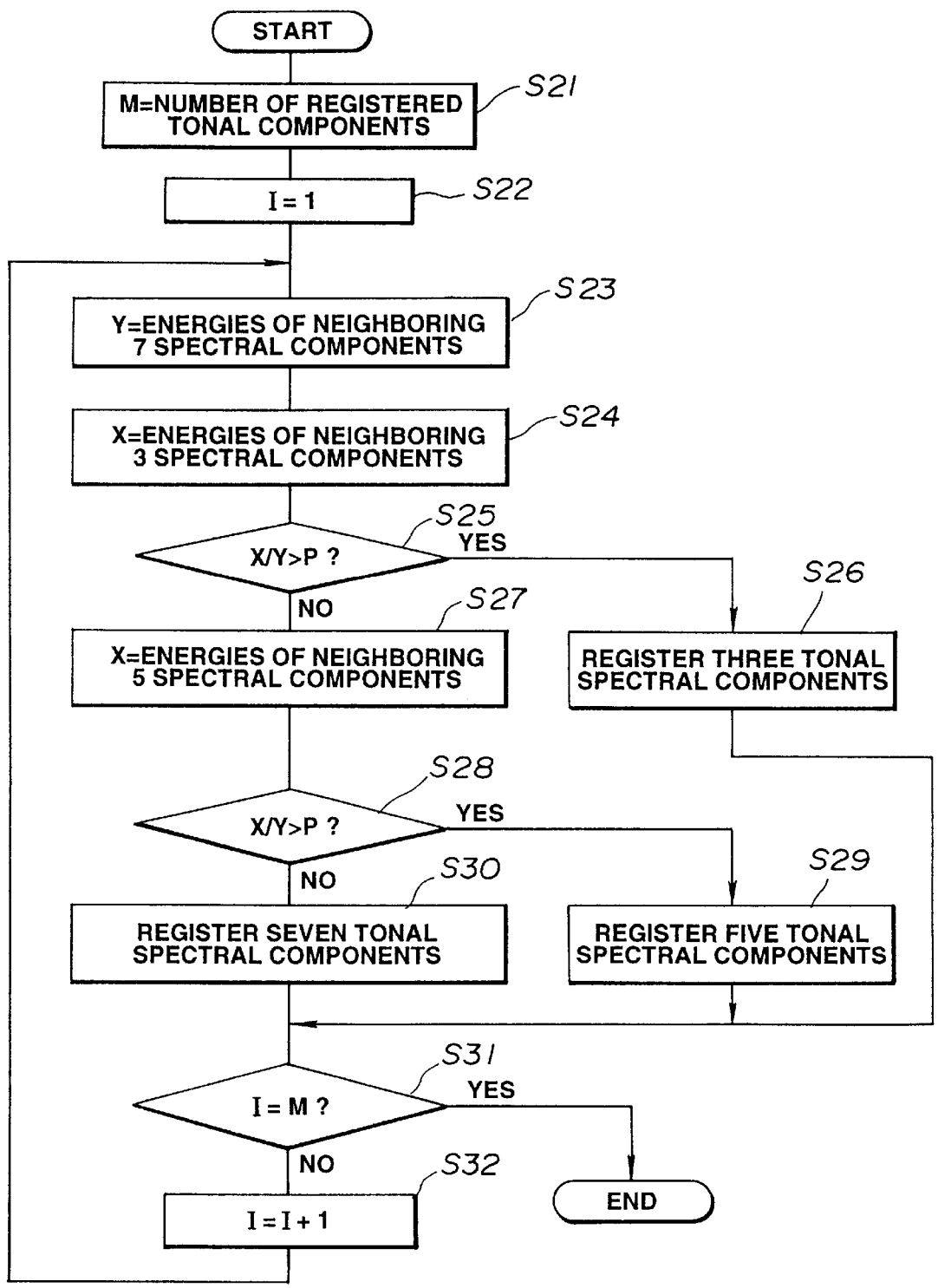
FIG. 8 is a flow chart for illustrating the operational sequence for determining the number of spectral elements of tonal components registered as the tonal components in the signal processing with the embodiment of FIG. 1.

FIG. 8 shows a typical operating sequence for determining the number of spectral signals of the tonal components registered in FIG. 3 as being tonal.

In FIG. 8, the maximum number of spectral signals of tonal components is set to 7. If the energy of three or five spectral components, centered about the signal of the absolute value of the locally maximum spectral component, exceeds a pre-set ratio relative to the energy of the seven spectral components, centered about the signal of the absolute value of the locally maximum spectral component, the number of the spectral elements of the tonal components is set to three or five, respectively. Although pre-registered tonal components are classed as described above, the classing operation may also be performed at the time of extracting the tonal components.

In FIG. 8, the number of registered tonal components is set at a step S2 as a variable M, and the serial number of the spectral signals I is set at a step S22 to 1. At a step S23, the energy of seven spectral elements neighboring to the locally maximum spectral element is substituted for the variable Y. The energy of three spectral elements neighboring to the locally maximum spectral component is substituted at a step S24 for a variable X.

At the next stp S25, it is checked whether or not the ratio of the energy of the neighboring seven spectral elements to the energy of the three spectral elements (X/Y) exceeds a preset magnitude P (X/Y>P ?). If the result at the step S25 is YES, that is if the magnitude P is exceeded, processing transfers to a step S26. If the result is NO, that is if the magnitude P is not exceeded, processing transfers to a step S27.

The number of constituent spectral elements of the tonal component is set at the step S26 as being three, that is as being three tonal spectral components. Processing then traverses to a step S31 as later explained.

At the step S27, the energy of five neighboring spectral elements centered about a locally maximum spectral component is substituted for the variable X. At the next stp S28, it is checked whether or not the ratio of the energy of the neighboring seven spectral elements to the energy of the five spectral elements (X/Y) exceeds a preset magnitude P (X/Y>P ?). If the result at the step S25 is YES, that is if the magnitude P is exceeded, processing transfers to a step S29. If the result is NO, that is if the magnitude P is not exceeded, processing transfers to a step S30.

The number of constituent spectral elements of the tonal component is set at the step S29 as being five, that is as being five tonal spectral components. Processing then transfers to the step S31 as later explained.

The number of constituent spectral elements of the tonal component is set at the step S30 as being seven, that is as being seven tonal spectral components. Processing then traverses to the step S31 as later explained.

At the step S31, it is checked whether or not the numbers of the tonal components M registered at the steps S26, S29 and S30 are equal to the serial number I of the spectral signal (I=M?). If the result is YES, that is if I=M, processing comes to a close. If otherwise, processing transfers to a step S32.

At the step S32, the serial number I of the spectral signal is incremented (I=I+1) and the above operational sequence is repeated. The signal component separating circuit 602 routes the frequency component, found to be the tonal component by the above sequence of operations, to the tonal component encoding circuit 603, while routing the remaining frequency components as noisy components to the noisy component encoding circuit 604. The signal component separating circuit 602 routes the information on the number of the tonal components, the position information and the information on the number of spectral elements indicating the number of the constituent spectral elements making up each tonal component, to the code string generating circuit 605.

Figure 6:
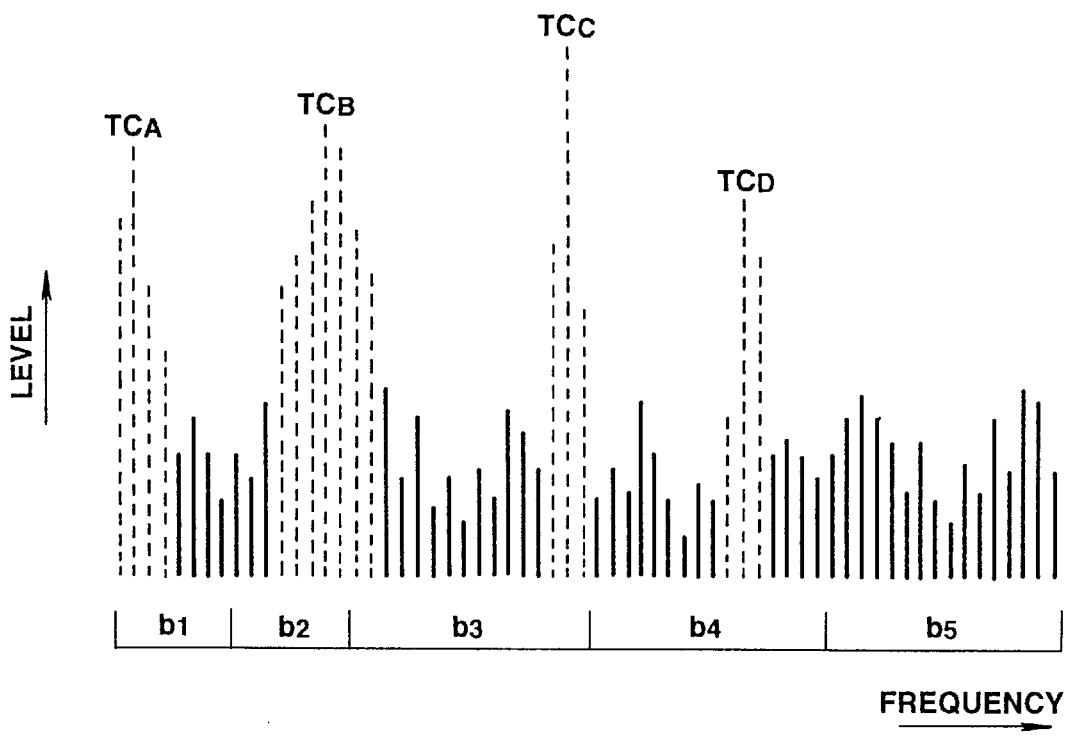
FIG. 6 illustrates the manner in which the number of spectral elements making up the tonal components in the signal encoding with the embodiment of FIG. 1 is made variable.
Figure 9:
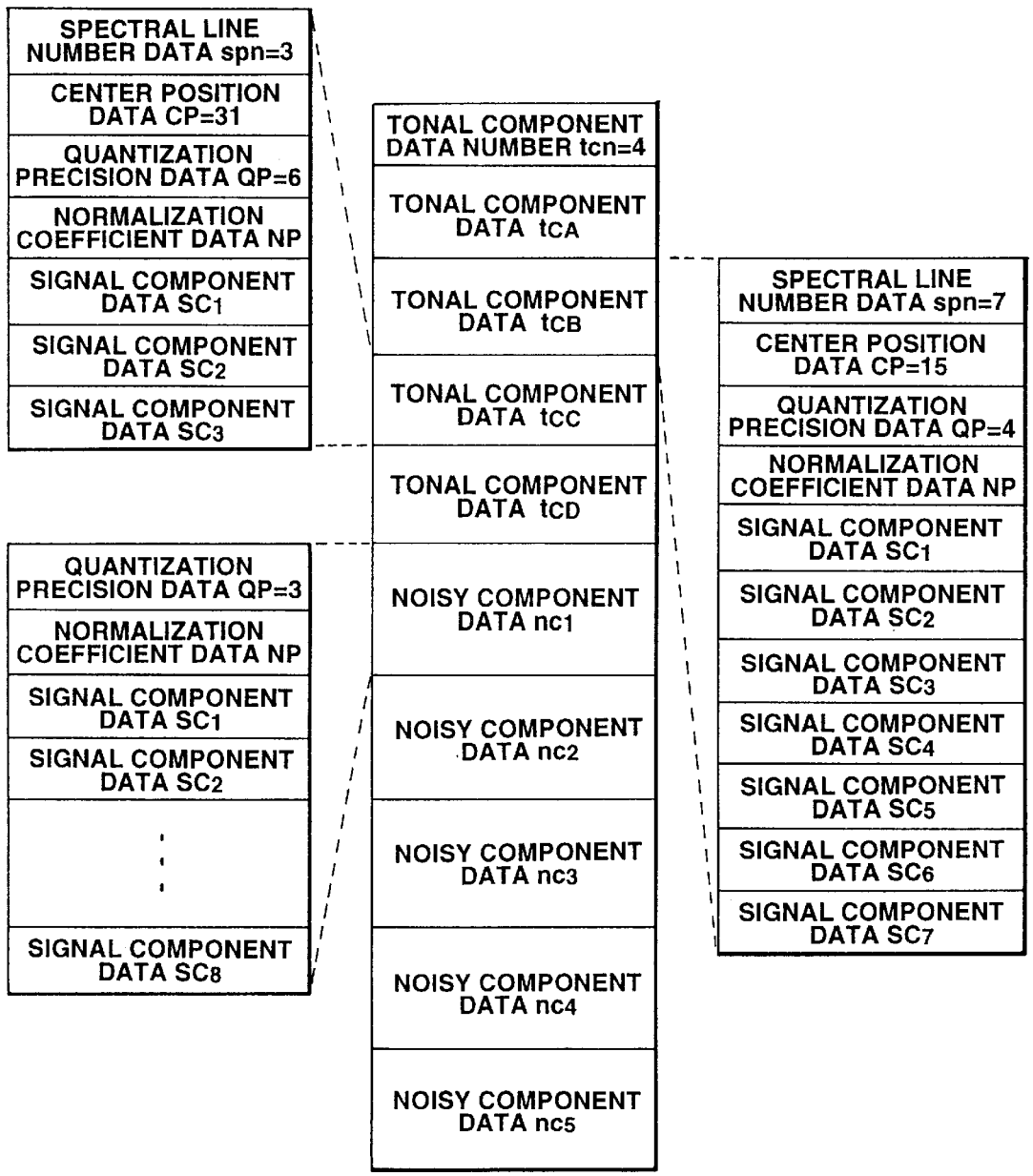
FIG. 9 illustrates recording of a code string obtained by signal encoding with the embodiment of FIG. 1.

FIG. 9 shows a concrete example of a code string in case the spectral signals of FIG. 6 are encoded using the encoding device of the present embodiment (the code strings recorded on the recording medium).

Referring to FIG. 9, the number of information data of the tonal components tcn (equal to four in the example of FIG. 6) is first recorded on the recording medium. Recording on the recording medium is then made in the sequence of the information on the tonal components $tc_A$, $tc_B$, $tc_C$, $tc_D$ associated with the tonal components $TC_A$, $TC_B$, $TC_C$, $TC_D$ shown in FIG. 6 and the information on the noisy components $nc_1$, $nc_2$, $nc_3$, $nc_4$, $n_5$, associated with the bands b1 to b5 shown in FIG. 6.

As the information on the tonal component, the information on the number of spectral elements spn, indicating the number of constituent spectral elements of the tonal component, which is seven for the tonal component $TC_B$, the information on the center position indicating the center spectrum of the tonal component, which is 15, for example, for the tonal component $TC_B$, the information on the quantization precision, indicating the number of quantizing bits, which is four, for example, and the information on the normalization coefficient NP, are recorded on the recording medium along with the information on the normalized and quantized signal components, such as information data $SC_1$, $SC_2$, $SC_3$, . . . $SC_7$. Of course, the information on quantization precision can be omitted if quantization precision is pre-fixed in dependence upon the frequency. As for the position information for the tonal components, the position of the lower most element of the tonal component, which is 12 for the tonal component $TC_B$, may be recorded in place of the above-mentioned center position information.

In the case of the information on the tonal components $tc_C$, the information on the number of the spectral elements spn=3, the information on the center position CP=31, and the information on quantization precision QP=6, with the information data on the signal components being $SC_1$, $SC_1$ and $SC_3$.

As for the information on the noisy components, the information on quantization precision QP, which is three, for example, for the information on the tonal components $nc_1$, and the information on the normalization coefficients NP, are recorded on the recording medium along with the information on the normalized and quantized signal components, such as the information data $SC_1$, $SC_2$, $SC_3$, ... $SC_8$.

Figure 10:
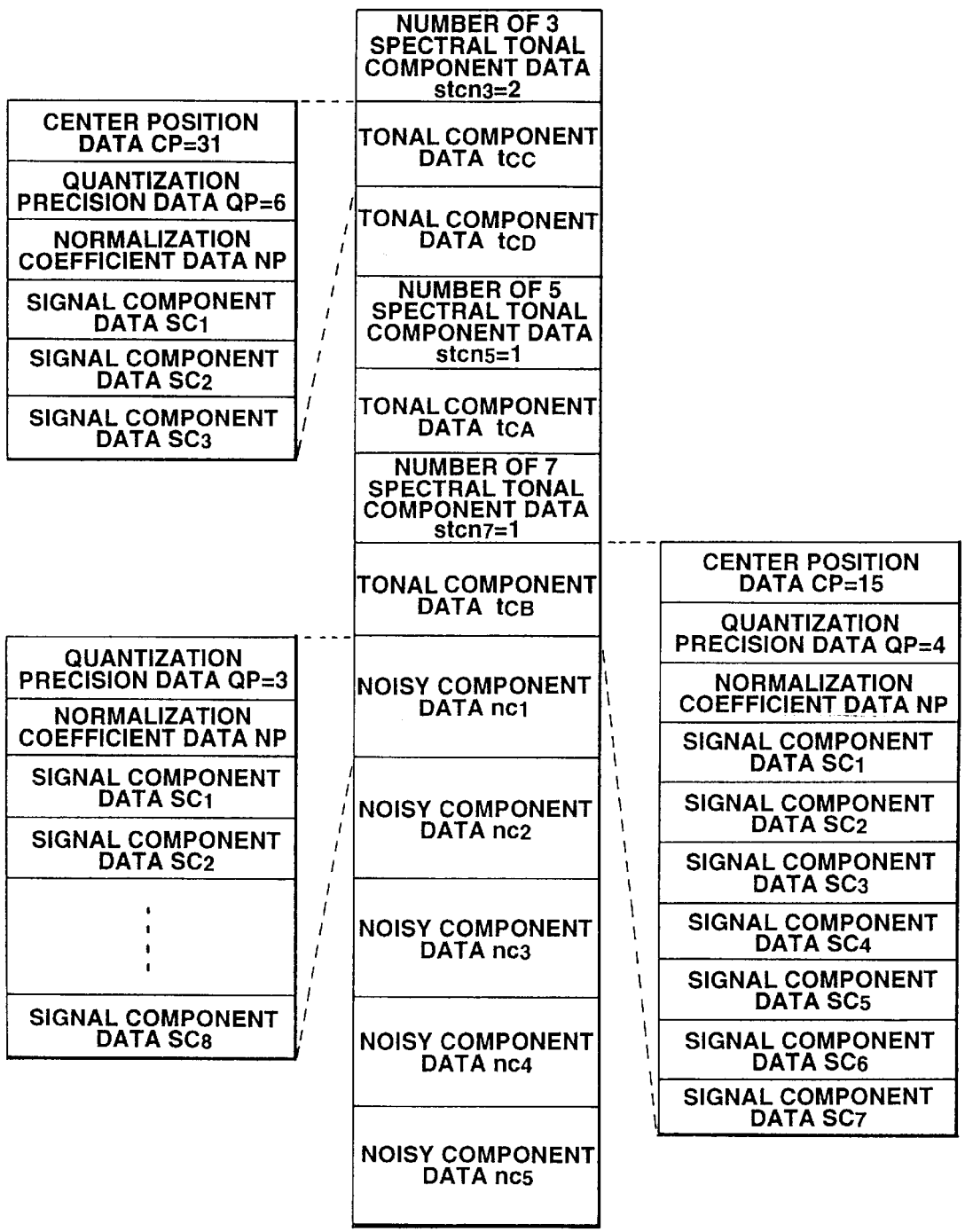
FIG. 10 illustrates recording of another code string obtained by signal encoding with the embodiment of FIG. 1.
Figure 11:
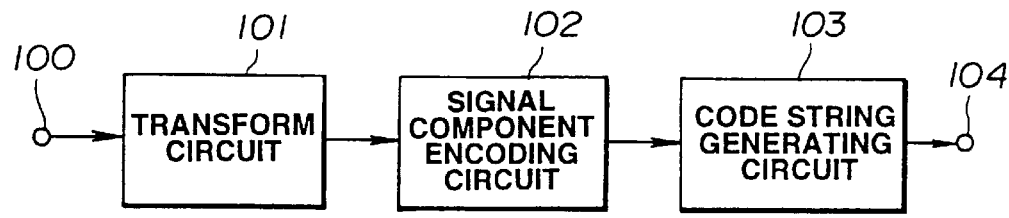
FIG. 11 is a block circuit diagram showing a construction of a conventional encoding device.

A variety of the constitution other than that shown in FIG. 9 may be conceived of the code string obtained on encoding with the device of the present embodiment. FIG. 10 shows an example of constitution of the code string for efficient recording of the information on the number of spectral tonal components as required in the application of the encoding method of the present embodiment.

In the example of FIG. 10, the tonal components are recorded in groups each having the same number of spectral elements. That is, in the present example, the number of tonal components, which is two, for example, with the three-spectral tonal components, and the contents of the tonal components $TC_C$, $TC_D$ (information data $tc_C$, $tc_D$ of the tonal components), are recorded, followed by the information showing all of the tonal components having the number of the constituent spectral elements equal to five, such as the number of the information data on the five spectral tonal components=1 and the information on the tonal components $tc_A$ and information showing all of the tonal components having the number of the constituent spectral elements equal to seven, such as the number of the information data on the seven spectral tonal components=1 and the information on the tonal components $tc_B$. If the tonal components are recorded in groups each comprised of the same number of the constituent spectral elements, there is no necessity of recording the data on the number of the spectral tonal components, thus enabling efficient encoding especially in case of a large number of the tonal components.

The recording sequence may also be modified from that shown above. For example, the information data on the three spectral tonal components, the information data on the five spectral tonal components, and the information data on the seven spectral tonal components, are first recorded in this order, followed by the information data on the contents of the tonal components Although the above description is mainly directed to the encoding of acoustic signal, the present method may also be applied to the encoding of waveform signals in general. However, the present method may be applied most effectively to the acoustic signals because the information on the tonal components play an important role in connection with the psychoacoustic effects.

Although the tonal components are quantized and normalized prior to encoding, this is not mandatory and the tonal components that are not normalized and simply quantized may also be encoded in accordance with the encoding method of the present invention. Also, if a certain code is directly associated with the spectral distribution of each tone, instead of quantization followed by encoding, the number of the spectral elements constituting the tonal components may be changed in accordance with the encoding method of the present invention.

It is noted that the present invention may be applied in compunction with the various methods proposed in out JP Patent Application Nos.5-152865 (1993) and 5-183322 (1993).

That is, the noisy components may be encoded more efficiently by taking advantage of the characteristics of the human auditory sense. For example, the masking effect operates effectively in the vicinity of the tonal signal on the frequency axis. Consequently, if encoding is made on the assumption that the noisy component in the vicinity of the extracted tonal component is zero, there is produced no significant difference, as perceived by the ears, between the acoustic signals decoded from the encoded signals and the original sound. With this method, signal compression may be achieved in an extremely simple manner if the encoding unit is constructed on the basis of the critical bandwidth.

It is also possible to reduce the magnitude of a pre-set number of spectral components neighboring to the tonal components to zero, instead of reducing the noisy components of the encoding unit to zero. This pre-set number may be changed on the basis of characteristics of the auditory sense, depending on the frequency of the tonal components, so that it is smaller and larger towards the lower and higher frequency ranges, respectively. With this method, psychoacoustically effective highly efficient compression may be achieved by simpler means. Since the masking by the tonal components operates strongly towards the higher frequency range, the range for reducing the noisy component to zero may be set non-symmetrically.

The noisy components may also be encoded by so-called variable length coding described in D. A. Huffman, A Method for Construction of Minimum Redundancy Codes, Proc. I.R.E., 40, p.1098 (1952). With such encoding method, the encoding efficiency may be improved by allocating shorter code lengths to patterns occurring more frequently. Such codes may be used with the above-mentioned method of reducing the noisy components to zero. Specifically, since the zero components appear frequently, codes of shorter lengths may be allocated to zero for improving the coding efficiency. The variable length encoding may also be applied to the tonal components.

The above-described method resides in separating the tonal components and reducing them and the near-by signals to zero and subsequently encoding the noisy components. It is however possible to subtract encoded and subsequently decoded tonal components from the original spectral signals and to encode the resulting difference signal. Thus the spectral signals less the encoded and subsequently decoded tonal components are encoded. In addition, tonal components may be extracted from the spectral signals and encoded for improving the coding precision of the spectral signals. Repetition of the above process results in improved coding precision.

Figure 18:
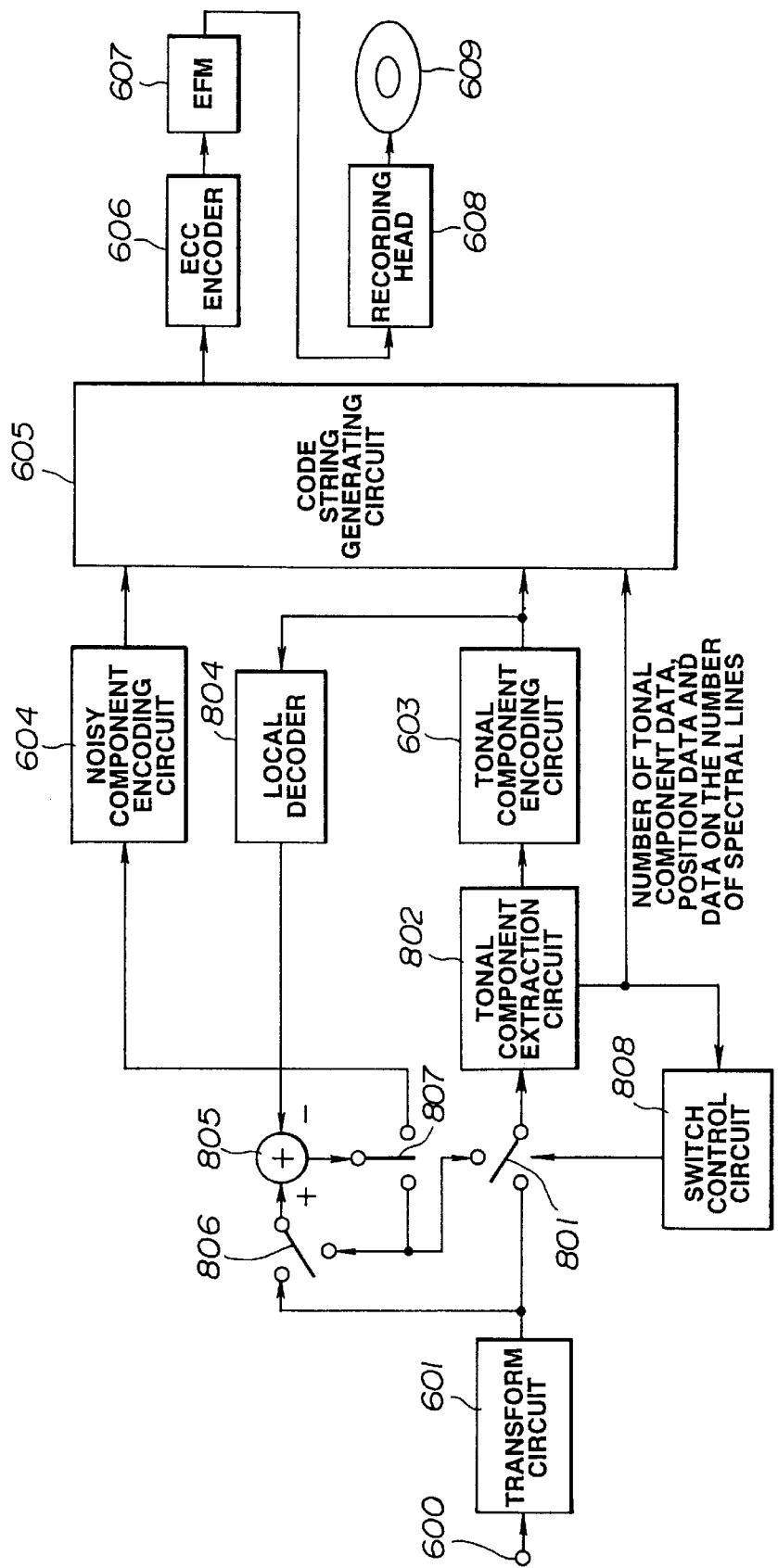
FIG. 18 is a block circuit diagram showing a construction of an alternative embodiment of the encoding device of FIG. 1.

Referring to FIG. 18, a signal encoding device for carrying out the above method in now explained. The same parts or components as those of FIG. 1 are denoted by the same numerals and the corresponding description is not made for simplicity.

The spectral signal produced by the transform circuit 601 is routed to a tonal component extraction circuit 802 via a switch 801 controlled by a switch control circuit 808. The tonal component extraction circuit 802 discriminates the tonal components by the processing as described in connection with FIGS. 3 and 8 and routes only the discriminated tonal components to the tonal component encoding circuit 603. The tonal component extraction circuit 802 outputs the number of the information data on the tonal components, the information on the center position and the number of information data indicating the number of spectral elements of the tonal components to the code string generating circuit 605. The tonal component encoding circuit 603 normalizes and quantizes the input tonal components and routes the normalized and quantized tonal components to a local decoder 804 and to the code string generating circuit 605. The local decoder 804 dequantizes and denormalizes the normalized and quantized tonal components in order to restore the original tonal components. However, the quantization noise is now contained in the restored signal. An output of the local decoder 804 is routed as a first decoded signal to an additive node 805. The original spectral signals are supplied from the transform circuit 601 to the additive node 805 via a switch 806 controlled by the switch controlling circuit 808. The additive node 805 subtracts the first decoded signal from the original spectral signal to output a first difference signal. If the extraction of the tonal components, encoding, decoding and subtraction are completed in one operation, the first difference signal is supplied as the noisy component to the noisy component encoding circuit 604 via a switch 807 controlled by a switch controlling circuit 808. If the extraction of the tonal components, encoding, decoding and subtraction are repeated, the first difference signal is routed via the switch 801 to the tonal component extraction circuit 802. The tonal component extraction circuit 802, tonal component encoding circuit 603 and the local decoder 804 perform the same operation as described above to produce a second decoded signal which is routed to the additive node 805 which is also fed with the first difference signal via the switch 806. The additive node 805 subtracts the second decoded signal from the first difference signal to output a second difference signal. If the extraction of the tonal components, encoding, decoding and subtraction are completed by two operations, the second difference signal is routed as the noisy component to the noisy component encoding circuit 604 via the switch 807. If the extraction of the tonal components, encoding, decoding and subtraction are repeated further, the same operations as those described above are performed by the tonal component extraction circuit 802, tonal component encoding circuit 603, local decoder 804 and the additive node 805. The switch controlling circuit 808 maintains the threshold value of the number of the information data of the tonal components and controls the switch 807 to terminate the extraction of the tonal components, encoding, decoding and subtraction if the number of the information data of the tonal components supplied from the tonal component extraction circuit 802 exceeds the threshold value. It is also possible to terminate the extraction of the tonal components, encoding, decoding and subtraction at the time point when extraction of the tonal components ceases. If the above method is employed, sufficient coding precision may be maintained even although the upper limit of the number of bits for quantizing the tonal components is set to a lower value and hence the number of bits for recording the number of quantizing bits may be advantageously diminished. The present method of extracting the tonal components in plural stages in the manner described above may be applied not only to the case of subtracting a signal equivalent to the encoded and decoded tonal components from the original spectral signals, but to the case of reducing the spectral signals of the extracted tonal components to zero. Thus the expression such as "signals freed of the tonal components" are meant to comprehend these two cases.

The extraction of the tonal components may be limited to higher frequency bands.

If, in performing transform into spectral signals in general, sufficient frequency resolution is to be maintained in the lower frequency range, the conversion domain for transform into spectral signals needs to be selected to be longer. However, this cannot be achieved with small-size device without difficulties. For encoding the tonal components, it is necessary to encode the information on normalization or the position information of the tonal components. However, should a large number of tonal components difficult to separate exist in the lower frequency range, it is not convenient to record the information data in a number corresponding to the number of the extracted tonal components in improving the coding efficiency. Therefore, if sufficient frequency resolution cannot be maintained in the lower range, it suffices to separate and encode the tonal components only at the high frequency range.

For maintaining sufficient frequency resolution in the lower frequency range, the frequency resolution for the lower range may be changed from that for the higher range.

The recording medium according to the present invention is such a recording medium on which are recorded signals encoded using the above-described encoding unit. The recording medium may include a disc-shaped recording medium, such as an optical disc, a magneto-optical disc, a phase change type optical disc or a magnetic disc, a tape-shaped recording medium, such as a magnetic tape, and a semiconductor recording medium, such as a memory card or an IC chip.

Although the code string is recorded on the recording medium in the above-described embodiments, it may also be transmitted over an optical fiber.

What is claimed is:

1. A method for encoding an input signal comprising the steps of:

breaking down the input signal into frequency components;

separating the frequency components into a first signal made up of a plurality of tonal components and a second signal made up of other components, the number of the frequency components making up the tonal components being variable;

encoding said first signal; and encoding said second signal.

2. The method as claimed in claim 1, further comprising the steps of encoding information indicating the number of the frequency components making up each tonal component.

3. The method as claimed in claim 1, wherein said breaking down is orthogonal transform.

4. The method as claimed in claim 1, wherein the step of encoding said first signal comprises the step of quantizing said first signal.

5. The method as claimed in claim 1, wherein the step of encoding said first signal comprises the step of normalizing said first signal.

6. The method as claimed in claim 1, further comprising the step of grouping said tonal components each made up of the same number of the frequency components into code strings.

7. The method as claimed in claim 1, wherein said input signal is an acoustic signal.

8. An apparatus for encoding an input signal comprising:

means for breaking down the input signal into frequency components;

means for separating the frequency components into a first signal made up of a plurality of tonal components and a second input signal made up of other components, the number of the frequency components making up the tonal components being variable;

means for encoding said first signal; and means for encoding said second signal.

9. The apparatus as claimed in claim 8, further comprising means for encoding information indicating the number of the frequency components making up each tonal component.

10. The apparatus as claimed in claim 8, wherein said breaking down is orthogonal transform.

11. The apparatus as claimed in claim 8, wherein said first encoding means includes means for quantizing said first signal.

12. The apparatus as claimed in claim 8, wherein said first encoding means includes means for normalizing said first signal.

13. The apparatus as claimed in claim 8, further comprising means for grouping said tonal components each made up of the same number of the frequency components into code strings.

14. The apparatus as claimed in claim 8, wherein said input signal is an acoustic signal.

15. A signal recording medium on which an encoded signal is recorded, said recording medium being formed by the steps of:

breaking down an input signal into frequency components;

separating the frequency components into a first signal made up of a plurality of tonal components and a second signal made up of other components, the number of the frequency components making up the tonal components being variable;

encoding said first signal;

encoding said second signal; and recording the encoded first and second signals on the recording medium.

16. The signal recording medium as claimed in claim 15, formed by additional steps of:

encoding information indicating the number of the frequency components making up each tonal component; and recording the information indicating the number of frequency components making up each encoded tonal component.

17. The signal recording medium as claimed in claim 15, wherein said breaking down is orthogonal transform.

18. The signal recording medium as claimed in claim 15, wherein the step of encoding said first signal comprises quantizing said first signal.

19. The signal recording medium as claimed in claim 15, wherein the step of encoding said first signal comprises normalizing said first signal.

20. The signal recording medium as claimed in claim 15, formed by the additional step of grouping said tonal components each made up of the same number of the frequency components into code strings.

21. The signal recording medium as claimed in claim 15, wherein the input signal is an acoustic signal.

22. A signal recording medium on which encoded signals are recorded, wherein information on plural tonal components and information on noisy components are recorded separately therein, and wherein said information on said tonal components includes information indicating the number of frequency components making up each tonal component.

23. The signal recording medium as claimed in claim 22, wherein said information on said tonal component includes one of information on normalization coefficients and information on quantization precision.

24. The signal recording medium as claimed in claim 22, wherein the information on said tonal components is recorded according to groups of information on the tonal components having the same number of the frequency components making up each tonal component.

25. A method for decoding an encoded signal comprising the steps of:

decoding a first signal made up of plural tonal components to generate a first decoded signal;

decoding a second signal made up of noisy components to generate a second decoded signal; and combining said first and second decoded signals and inverse transforming the combined signals, or separately inverse transforming said first and second decoded signals and combining the inverse transformed signals, the combining and inverse transforming step being performed on the basis of information indicating the number of the frequency components making up each tonal component.

26. The method as claimed in claim 25, wherein said combining and inverse transforming step comprises inverse orthogonal transforming said first and second decoded signals.

27. The method as claimed in claim 25, wherein the step of decoding the first signal comprises dequantizing said first signal.

28. The method as claimed in claim 25, wherein the step of decoding the first signal comprises denormalizing said first signal.

29. The method as claimed in claim 25, wherein said first signal is grouped according to groups of information on the tonal components having the same number of the frequency components making up each tonal component.

30. The method as claimed in claim 25, wherein the signal obtained by said inverse transforming step is an acoustic signal.

31. An apparatus for decoding an encoded signal comprising:

first decoding means for decoding a first signal made up of plural tonal components to generate a first decoded signal;

second decoding means for decoding a second signal made up of noisy components to generate a second decoded signal; and combining and inverse transforming means for combining said first and second decoded signals and inverse transforming the combined signals, or separately inverse transforming said first and second decoded signals and combining the inverse transformed signals, the combining and inverse transforming means performing the combining operation on the basis of information indicating the number of the frequency components making up each tonal component.

32. The apparatus as claimed in claim 31, wherein said combining and inverse transforming means comprises inverse orthogonal transforming means for inverse orthogonal transforming said first and second decoded signals.

33. The apparatus as claimed in claim 31, wherein said first decoding means comprises dequantizing means for dequantizing said first signal.

34. The apparatus as claimed in claim 31, wherein said first decoding means comprises denormalizing means for denormalizing said first signal.

35. The apparatus as claimed in claim(31, wherein said first signal is grouped according to groups of information on the tonal components having the same number of the frequency components making up each tonal component.

36. The apparatus as claimed in claim 31, wherein an output of said combining and inverse transforming means is an acoustic signal.

* * * * *